INVENTOR.
HARVEY J. KLEE

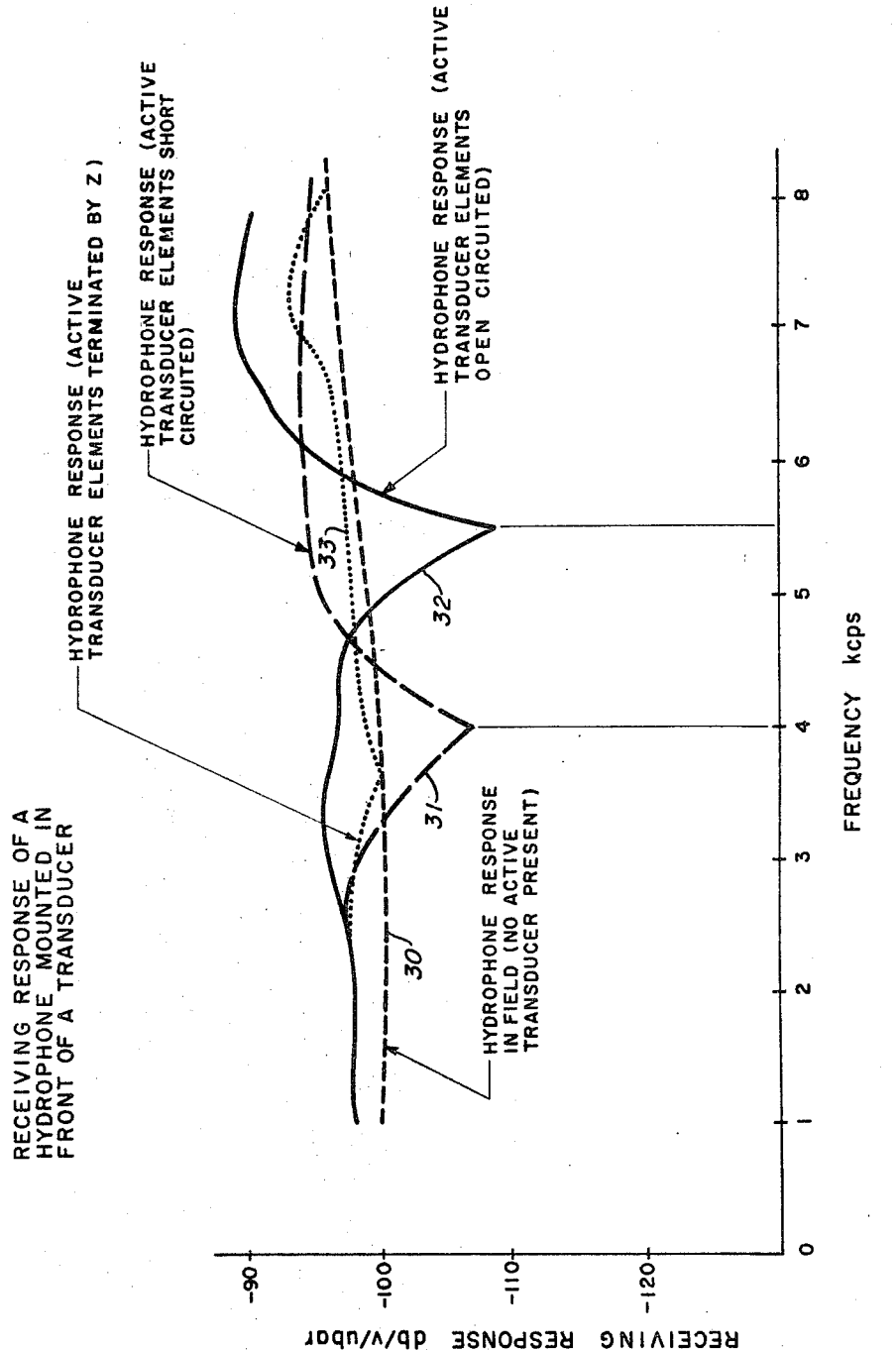

United States Patent Office 3,425,031
Patented Jan. 28, 1969

3,425,031
TRANSMIT-RECEIVE SONAR
ARRAY NETWORK
Harvey J. Klee, San Diego, Calif., assignor to the United
States of America as represented by the Secretary of
the Navy
Filed Oct. 18, 1967, Ser. No. 676,689
U.S. Cl. 340—3                     5 Claims
Int. Cl. G01s 9/66

ABSTRACT OF THE DISCLOSURE

Receiving hydrophones must, for various mechanical reasons, be mounted on and in front of the radiating faces of an array of transmitting transducers. During receiving periods power to the transducers must be turned off. Unfortunately, the active transducer elements are not rigid baffles in the region of their mechanical resonance and the response of the active transducer element to a pressure wave reduces the receiving hydrophone response. In this invention the transducer terminals are connected during receiving periods to a reactive load of the proper sign and magnitude to render the faces of the transducers substantially immobile.

---

The invention described herein may be manufactured and used by or for the Government of the United States of America for governmental purposes without the payment of any royalties thereon or therefor.

Background

Ship borne sonar often comprises a large cylindrical array of transducers for ensonifying the surrounding water with either directional beams or omnidirectional fields of acoustical energy of considerable power. The radiating faces of the transducers are mounted side by side and quite closely together, the array being suspended from the keel inside a flooded dome. The dome is streamlined to minimize drag and local noise. The receiving hydrophones must be mounted inside the dome and preferably on the array and forwardly of the active transducer faces.

Unfortunately, the idling active transducer elements adversely effects the hydrophone signals during receiving periods. If the transducer terminals are either short circuited or open circuited a dip occurs in the receiving hydrophone response in the region of the mechanical response of the array.

An object of this invention is to provide an improved system of transmitting transducers and receiving hydrophones.

A more specific object of this invention is to provide an improved system with juxtaposed arrays of transmitting and receiving elements in which interaction between the elements are effectively minimized.

The objects of this invention are attained by connecting the transducer terminals during receiving periods to a reactive load of a sign opposite to the sign of the blocked impedance of the transducer element, and equal in magnitude to that impedance to render the active transducers a rigid baffle.

Other objects and features of this invention will become apparent to those skilled in the art by referring to the preferred embodiments described in the following specification and shown in the accompanying drawings in which:

FIG. 2 is a frequency vs. receiver response of the hydrophones with and without the features of this invention.

Figure 1:
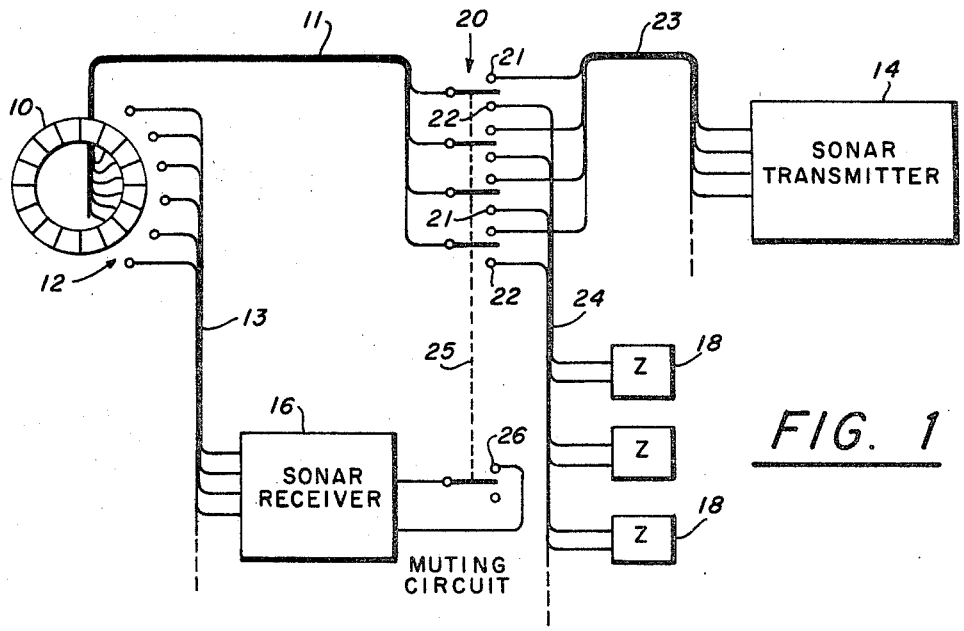
FIG. 1 is a block diagram of the principal elements embodying this invention.

FIG. 1 shows in plan a cylindrical array of transmitting transducers 10. The particular array contemplated here is known as the SQQ-23 which may be some eight feet in diameter and have 48 side-by-side transducers in the eight foot circle. The vertical rows or staves of the cylinder, not shown, may comprise nine transducer elements, making some 432 transducer elements in the total array. At 11 is shown a cable containing a pair of conductors for each transducer element.

At 12 are shown an array of hydrophone receiving elements. The receiving hydrophones are mounted on the transducer array and each hydrophone is placed slightly forwardly of and between adjacent pairs of transducers. At 13 is a cable containing a pair of conductors for each of the hydrophones, leading to the sonar receiver 16.

In normal operation the active transducers are energized with a pulse typically in the range of 160 milliseconds to 1.92 seconds duration and of a frequency of, say, 4 to 6 kilocycles per second. After the pulse, the transducers are disconnected from the transmitter 14 and echoes are awaited. During the listening period the hydrophones are scanned for any signal that may arrive.

The transmit-receive switch 20 connects each transducer, or small group of transducers, to an amplifier in the sonar transmitter for transmitting the mentioned time duration pulses. Although the switching operations represented at 20 are preferably performed electronically, the mechanical equivalent of the switches are shown for clarity. Each switch comprises the equivalent of a double throw armature or blade and two contacts 21 and 22. Each of the contacts 21 are connected through conductors in the cable 23 to the transmitter 14. The contacts 22 of the switch, however are each connected, respectively, through separate conductors in cable 24 to terminating impedance networks 18. During periods of transmission, the transmit-receive switches 20 should operate, through a suitable mechanical or electrical interlock 25, muting circuit 26 in the receiver to disable the receiver. That is, when the system is transmitting the armatures of switch 20 are in the upper position and the transmitter 14 is connected to the transducers. During the receiving periods the armatures are in a lower position and the squelch circuit is opened to enable the receiver; and at the same time the transducers are each connected to one of the impedance networks 18.

In FIG. 2, is shown the response, in decibels per volt per microbar, of one conventional ceramic type hydrophone throughout a frequency band from 1 to 8 kilocycles per second. Line 30 shows the response to be quite level throughout the frequency range when the hydrophone is in free space and away from the influence of any reflecting object. If now the hydrophone is placed close to the face of a transducer and if the transducers elements are short circuited the output of the hydrophone dips markedly at about 4 kilocycles per second as shown at 31; or, if the transducer elements are open circuited the frequency dip shifts to about 5.5 kilocycles per second as shown at 32. These undesirable dips in the response are the result of unstable baffle effects of the transducer elements. The movable faces of the transducers respond to the oncoming acoustic signal in the region of 4 to 6 kc. s. and therefore reduce the pressure wave acting on the receiving hydrophones.

According to an important feature of this invention the dips in the hydrophone responses are eliminated by connecting the electrical terminals of each of the transducers to one of the impedances 18. Impedance 18 is of such a size and sign as to make the face of the connected transducer substantially immobile at the frequency of operation. The transducer face then functions as a rigid baffle, and all resonant effects are eliminated. When the transducers are thus terminated, the hydrophone response is nearly flat as shown in dotted line 33 of FIG. 2 where the response is substantially flat.

If the blocked impedance of a transducer is capacitive as in the case of the typical ceramic element, it is necessary to connect a negative capacitance, or inductance, of the proper value at the operating frequency across the terminals of the transducer. That is, it is essentially a matter of terminating the active transducer element with the negative of the reactive component of the blocked impedance of the active transducer element. The blocked impedance input of the transducer is the impedance seen at the transducer terminals when the head velocity is held to zero.

Figure 3:
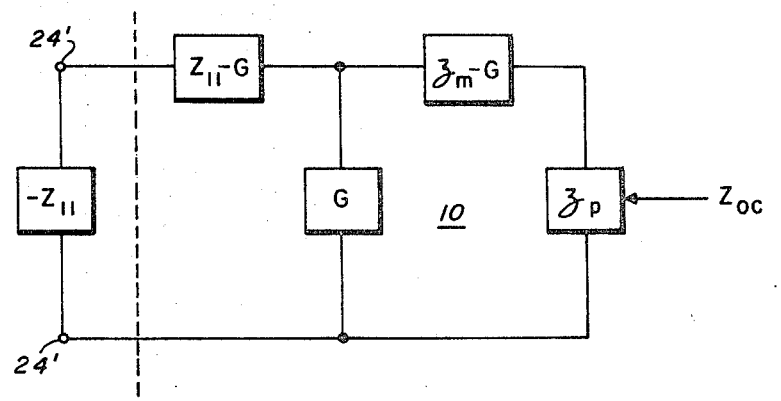
FIG. 3 is the equivalent block diagram of transducers of the type contemplated here.

The equivalent circuit of a transducer is shown in FIG. 3 where $Z_{11}$ is the blocked electrical impedance, G is the electro-mechanical coupling impedance, $Z_m$ is the mechanical impedance and $Z_p$ is the radiation impedance. $Z_{oc}$ is the impedance of the transducer as seen by the pressure wave. According to this invention the impedance $-Z_{11}$ shown at 18 is connected across the terminals 24' of the transducer. Impedance $-Z_{11}$ is equal to but of a sign opposite to he sign of impedance $+Z_{11}$ in the transducer. When these two quantities are equal and of opposite sign the face of the transducer has zero velocity and functions as a rigid baffle.

One simple technique for obtaining the precise value of the impedance $-Z_{11}$ is to place a vibrating motor against the face of the transducer and drive the transducer face with the mechanically coupled vibrator at the desired signal frequency. The impedance $-Z_{11}$ is then adjusted upwardly or downwardly until the face becomes rigid and the velocity zero. This technique now known as the "dummy load" technique is more fully described in the Patent 3,303,688 to Hickman and Martin dated Feb. 14, 1967. If the transducer is of the piezo electric type its impedance is predominently capacitive in nature and the terminating impedance 18 must be inductive. If however the transducer is electromechanical and is predominently inductive in nature the termination should be capacitive. A certain amount of negative resistance may or may not be required in the terminal network to match the electrical resistance of the transducer.

What is claimed is:

1. In combination:
    a transmitting transducer for converting electrical signals to acoustic energy and having predetermined internal reactive electrical and coupled mechanical impedance,
    a signal source,
    a terminal load network having an impedance of a sign opposite the sign of said predetermined impedance of said transducer and of a magnitude to render the radiating face of said transducer substantially immobile when connected to the terminals of said transducer, and
    switch means for alternately coupling said signal source and said load network to said terminal to immobilize said face between transmissions of acoustic energy.

2. The combination defined in claim 1 further comprising:
    a receiving hydrophone mounted forwardly of said transducer so that the face of said transducer functions as an immoble baffle during reception of acoustic signals.

3. The combination defined in claim 1 further comprising:
    an array of said transmitting transducers,
    a plurality of said load networks,
    an array of receiving hydrophones mounted on and forwardly of the transducer array, and
    a plurality of said load networks and a plurality of said switch means for coupling said transducers alternately to said signal source on the one hand and, respectively, to said networks on the other hand so the faces of said transducer function as a substantially fixed baffle for said hydrophones during receiving periods.

4. In combination:
    a transmitting transducer, a signal source for driving said transducer,
    a receiving hydrophone mounted adjacent the radiating face of said transducer and a receiver for detecting the hydrophone signals,
    a reactive load, said load being of a sign opposite to and of a magnitude substantially equal to the reactance of said transducer,
    switch mean for alternately connecting said transducer to said signal source and to said load so that the face of said transducer is substantially immovable during periods of reception.

5. The combination defined in claim 4 further comprising:
    a muting circuit connected to said receiver for muting said receiver during periods of transmission from said transducer,
    and a switch in said muting circuit interlock with and responsive to said switch means.

References Cited

UNITED STATES PATENTS 2,424,030  7/1947  Hayes _____ 340—3

RICHARD A. FARLEY, *Primary Examiner.*

U.S. Cl. X.R.

340—8